(12) United States Patent
Chen Feng

(10) Patent No.: US 9,908,191 B2
(45) Date of Patent: Mar. 6, 2018

(54) CLAMPING MECHANISM FOR CIRCULAR SAW MACHINE

(71) Applicant: KENTAI MACHINERY CO., LTD., Taichung (TW)

(72) Inventor: Huang Chen Feng, Taichung (TW)

( * ) Notice: Subject to any disclaimer, the term of this patent is extended or adjusted under 35 U.S.C. 154(b) by 330 days.

(21) Appl. No.: 14/272,698

(22) Filed: May 8, 2014

(65) Prior Publication Data

US 2015/0321272 A1    Nov. 12, 2015

(51) Int. Cl.
   B23D 47/04    (2006.01)

(52) U.S. Cl.
   CPC ........... B23D 47/04 (2013.01); *Y10T 83/7487* (2015.04)

(58) Field of Classification Search
   CPC . Y10T 83/7487; Y10T 83/7493; Y10T 83/75; Y10T 83/7513; Y10T 83/7697; B23D 47/04; B23D 45/04; B25B 5/02; B25B 5/06; B25B 5/061; B25B 5/166; B25B 5/068; B25B 1/2484; B25B 1/2415; B21D 39/026; B21D 39/037; B23Q 3/064; B23Q 3/06
   USPC ...... 83/452, 471.3, 268, 391, 382, 383, 456, 83/467.1, 468.1, 468.2, 468.7; 29/243.5, 29/243.56; 269/32, 24, 27, 35, 9, 10, 43, 269/900
   See application file for complete search history.

(56) References Cited

U.S. PATENT DOCUMENTS

| | | | | |
|---|---|---|---|---|
| 1,841,460 A | * | 1/1932 | Thatcher | B25B 1/08 269/218 |
| 2,334,911 A | * | 11/1943 | Drake | B23Q 3/06 269/134 |
| 2,350,099 A | * | 5/1944 | Dermond | B23Q 3/06 269/146 |
| 2,602,215 A | * | 7/1952 | Moohl | B23Q 3/06 269/221 |
| 4,923,186 A | * | 5/1990 | Durfee, Jr. | B25B 1/2463 269/271 |

(Continued)

FOREIGN PATENT DOCUMENTS

| | | | | |
|---|---|---|---|---|
| AT | 324876 B | * | 9/1975 | ............ B23D 47/00 |
| CN | 203062625 | * | 7/2013 | |

(Continued)

OTHER PUBLICATIONS

English Translation of DE857465C.*

*Primary Examiner* — Jennifer Swinney

(57) ABSTRACT

A clamping mechanism for a circular saw machine contains a base; a support holder including two parallel sliding rails; an inner clamp device including a fixing mount, a first horizontal clamping module, and a first upper clamping module; an upper clamping module including a first positioning seat, a first affixing protrusion, and an auxiliary pressing projection; an outer clamp device including a moving pedestal, a second horizontal clamping module, and a second upper clamping module, the moving pedestal having an external clamp arm and a second clamp block, the second upper clamping module having a second movable fixing block; the second upper clamping module including a second positioning seat and a second affixing protrusion; a driving device including a servo motor and a drive column. The fixing mount has an internal clamp arm and a first clamp block, the first horizontal clamping module has a first movable fixing block.

6 Claims, 11 Drawing Sheets

(56) References Cited

U.S. PATENT DOCUMENTS

| | | | | |
|---|---|---|---|---|
| 4,928,937 A | * | 5/1990 | Bernstein | B25B 1/103 |
| | | | | 269/136 |
| 5,161,443 A | * | 11/1992 | Huang | B23D 47/04 |
| | | | | 83/169 |
| 5,918,868 A | * | 7/1999 | Bruchman | B23B 31/4033 |
| | | | | 269/238 |
| 8,714,535 B2 | * | 5/2014 | Jung | B23Q 1/017 |
| | | | | 269/57 |

FOREIGN PATENT DOCUMENTS

| | | | | | |
|---|---|---|---|---|---|
| DE | 857465 C | * | 12/1952 | | B23D 47/04 |
| GB | 470130 A | * | 8/1937 | | B23D 47/04 |

\* cited by examiner

CLAMPING MECHANISM FOR CIRCULAR SAW MACHINE

FIELD OF THE INVENTION

The present invention relates to a clamping mechanism for a circular saw machine which saws a respective one of plural workpieces by using a sawing disc precisely and securely, thus reducing a sawing length of a tail end of the respective one of the plural workpieces to save working cost.

BACKGROUND OF THE INVENTION

With reference to FIGS. 1 to 3, a conventional clamping mechanism of a circular saw machine contains a base 10 on which a first clamp device 11 is disposed to clamp a workpiece A1 inside a sawing position, a second clamp device 12 for moving outwardly and inwardly to clamp the workpiece outside the sawing position, such that the workpiece A1 are clamped by the first clamp device 11 and a second clamp device 12 to be sawed by a sawing disc 16. Furthermore, the second clamp device 12 clamps the workpiece A1 outwardly after a sawing process to avoid the sawing disc 16 interfering the workpiece by vacuum suction. In addition, the first clamp device 12 includes a horizontal clamp module 13 and an upper clamp module 14, and the horizontal clamp module 13 has a fixing arm 130 for holding the workpiece A1, a first positioning block 131 located on an end portion of the fixing arm 130, and a second positioning block 132 moving horizontally relative to the first positioning block 131 to clamp or unclamp the workpiece A1. The upper clamp module 14 has a third positioning block 140 moving vertically and clamping the workpiece A1 by cooperating with the fixing arm 130. The base 10 also includes a support holder 14 on which two slide rails 150 are arranged to support the first clamp device 12 to move laterally along the first clamp device 11.

However, as shown in FIG. 2, a sawing length of a tail end of the workpiece A1 is at least a distance H1 from an outer surface of the second positioning block 132 to an inner surface of the third positioning block 140. Accordingly, the sawing length is too long to save working cost.

As illustrated in FIG. 3, iron chips 17 spray onto the support holder 15 in the sawing process and maintain between the two slide rails 150, thus damaging a servo motor 18 for driving the second clamp device 12.

The present invention has arisen to mitigate and/or obviate the afore-described disadvantages.

SUMMARY OF THE INVENTION

The primary object of the present invention is to provide a clamping mechanism for a circular saw machine which saws a respective one of plural workpieces by using a sawing disc precisely and securely, thus reducing a sawing length of a tail end of the respective one of the plural workpieces to save working cost.

To obtain the above objective, a clamping mechanism for a circular saw provided by the present invention contains: a base, a support holder, an inner clamp device, an outer clamp device, and a driving device.

The support holder is disposed on one side surface of the base and includes two parallel sliding rails arranged on a top end thereof.

The inner clamp device includes a fixing mount, a first horizontal clamping module, and a first upper clamping module. The fixing mount is fixed on the base and has an internal clamp arm for clamping a respective one of plural workpieces of various outer diameters thereon and has a first clamp block secured on an end portion thereof. The first horizontal clamping module is disposed on the fixing mount and has a first movable fixing block moving laterally so that the first clamp block clamps the respective one of the plural workpieces. The upper clamping module includes a first positioning seat, a first affixing protrusion, and an auxiliary pressing projection, the first positioning seat is fixed on the fixing mount, the first affixing protrusion is disposed on and moves vertically on the first positioning seat, one end surface of the auxiliary pressing projection extends toward and flushes with the first movable fixing block, and a width of the auxiliary pressing projection is less than the first affixing protrusion so that the auxiliary pressing projection clamps the respective one of the plural workpieces.

The outer clamp device includes a moving pedestal, a second horizontal clamping module, and a second upper clamping module, the moving pedestal is disposed on the fixing mount and has a bottom end slidably connecting with the two parallel sliding rails of the support holder, the moving pedestal has an external clamp arm extending outwardly from one side thereof to hold the respective one of the plural workpieces and has a second clamp block mounted on the external clamp arm, the second upper clamping module has a second movable fixing block moving horizontally to clamp the respective one of the plural workpieces relative to the second clamp block. The second upper clamping module includes a second positioning seat connected with the moving pedestal and a second affixing protrusion longitudinally moving to clamp the respective one of the plural workpieces relative to the external clamp arm.

The driving device includes a servo motor and a drive column, the servo motor is mounted in the fixing mount, and the drive column is inserted into the moving pedestal to be driven by the servo motor to rotate, such that the moving pedestal is driven by the servo motor to move close to or away from the fixing mount.

DETAILED DESCRIPTION OF THE PREFERRED EMBODIMENTS

Figure 1:
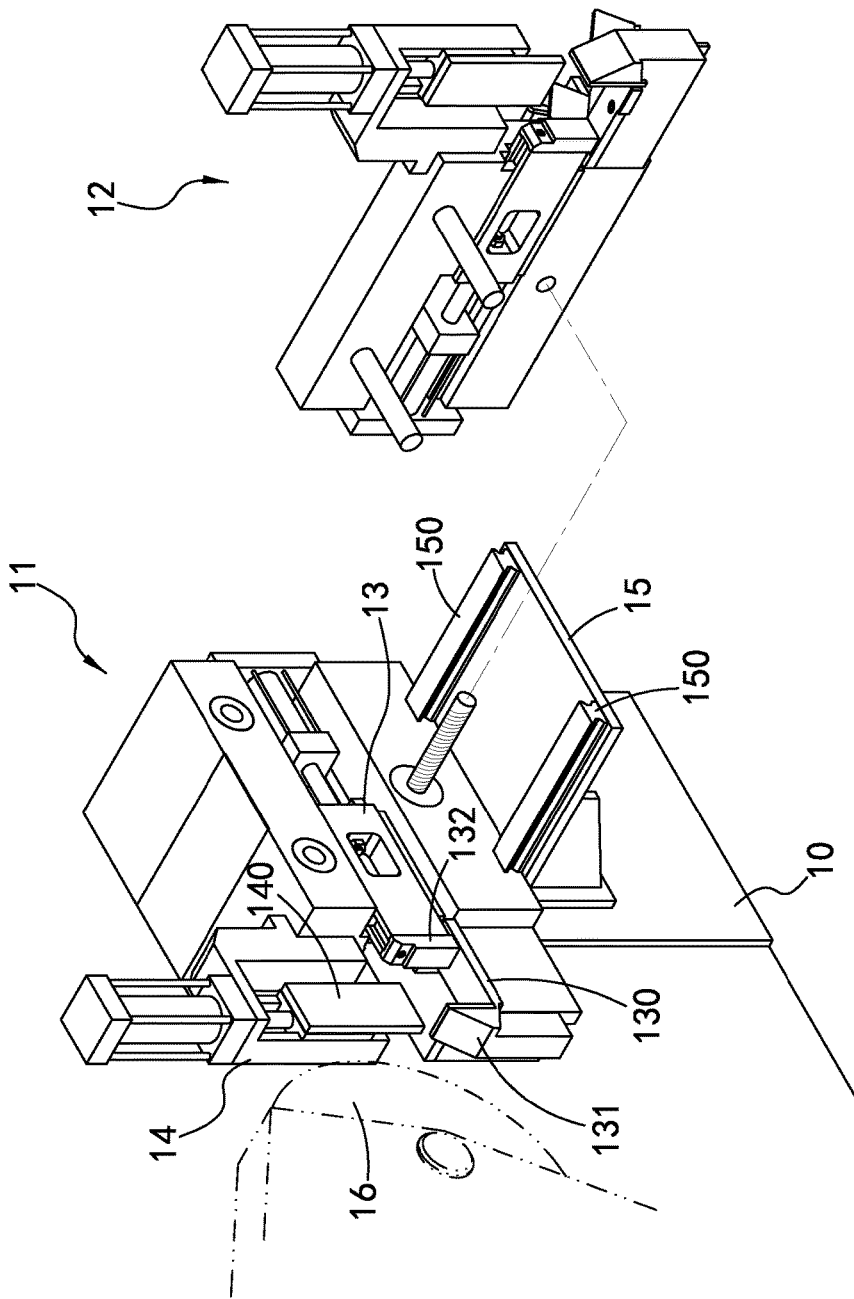
FIG. 1 is a perspective view of a conventional clamping mechanism for a circular saw machine.
Figure 2:
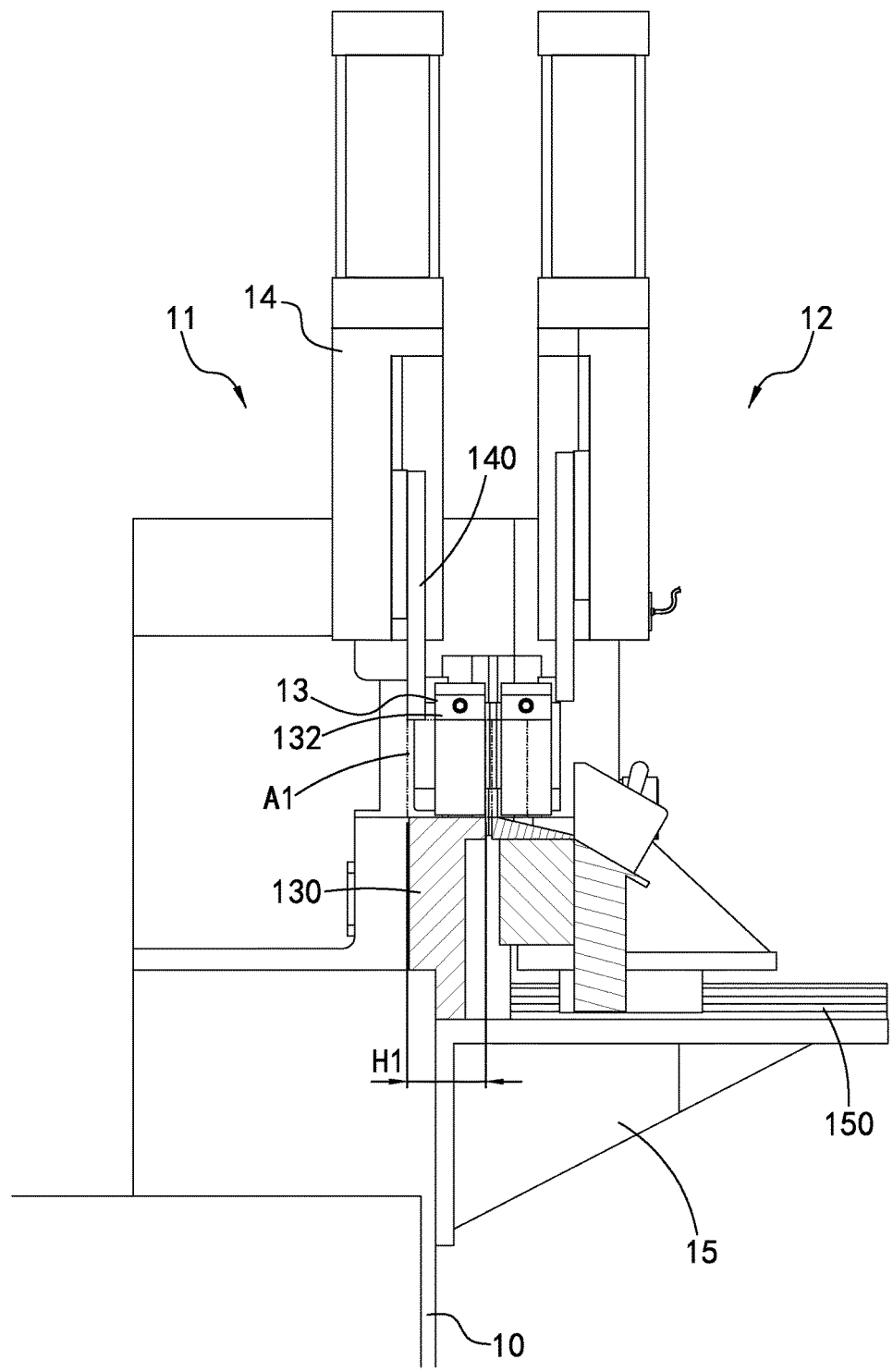
FIG. 2 is a cross sectional view showing the operation of the conventional clamping mechanism for the circular saw machine.
Figure 3:
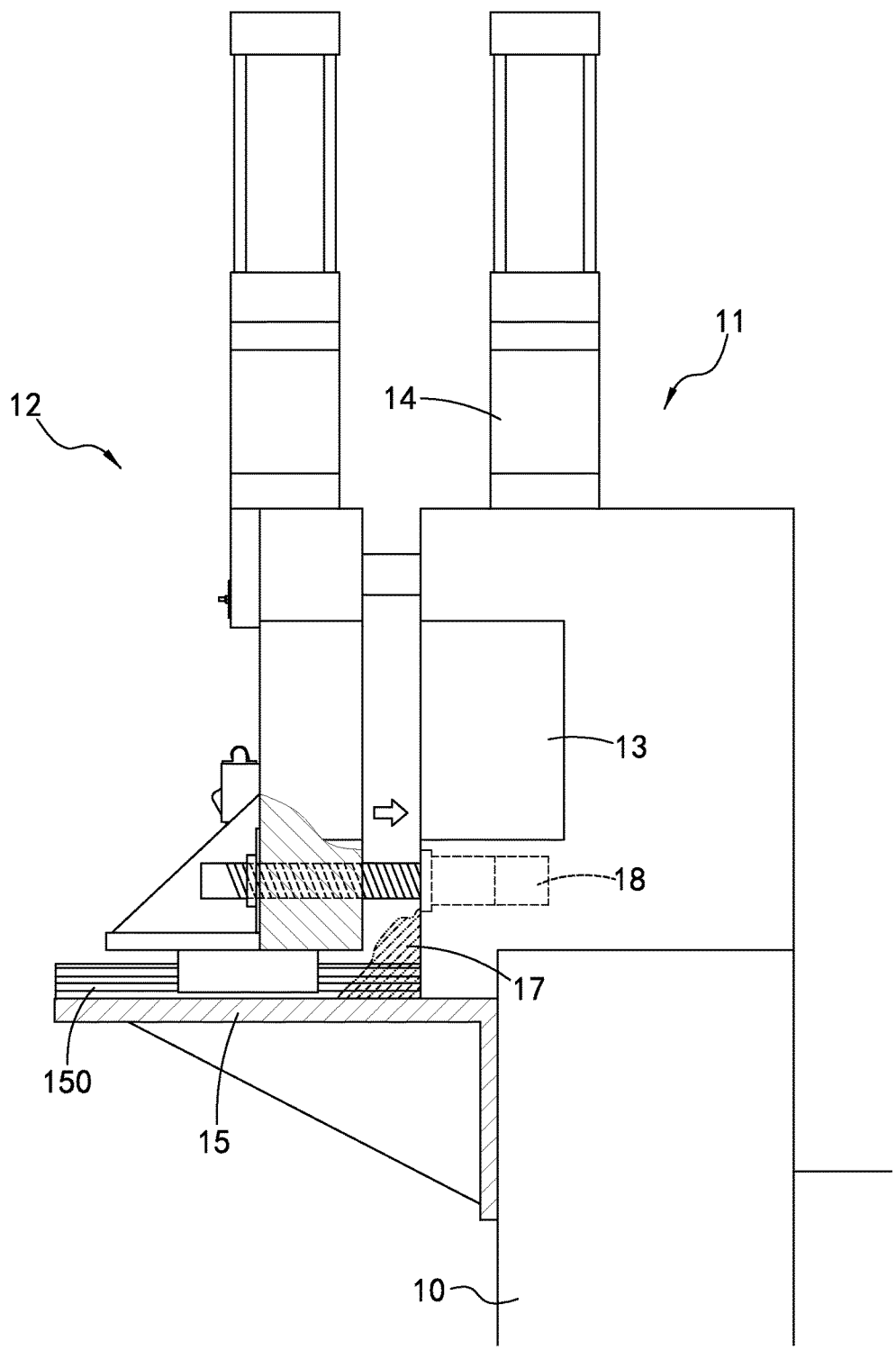
FIG. 3 is another cross sectional view showing the operation of the conventional clamping mechanism for the circular saw machine.

With reference to FIGS. 4-9, a clamping mechanism for a circular saw machine according to a preferred embodiment of the present invention comprises: a base 20, a support holder 30, an inner clamp device 40, an outer clamp device 50, and a driving device 60.

The support holder 30 is disposed on one side surface of the base 20 and includes two parallel sliding rails 31 arranged on a top end thereof and two chip outlets 32 defined between the two parallel sliding rails 31 and passing through a bottom end of the support holder 30. Each chip outlet 32 has a tilted inner wall so as to guide iron chips to fall therein along the tilted inner wall of said each chip outlet.

The inner clamp device 40 includes a fixing mount 41, a first horizontal clamping module 42, and a first upper clamping module 43. The fixing mount 41 is fixed on the base 20 and has an internal clamp arm 410 for clamping a respective one of plural workpieces A2 of various outer diameters thereon and has a first clamp block 411 secured on an end portion thereof. The first horizontal clamping module 42 has an inner telescopic cylinder 420, a first slide block 421, and a first movable fixing block 422. The inner telescopic cylinder 420 is disposed on the fixing mount 41 and drives the first slide block 421 to horizontally move on the inner clamp device 40, and the first movable fixing block 422 is mounted on the first slide block 421 by ways of a fixing bolt 423 and is driven by the inner telescopic cylinder 420 to move laterally, hence the first clamp block 411 clamps the respective one of the plural workpieces A2. The upper clamping module 43 includes a first positioning seat 430, a first upright cylinder 431, a first vertical moving block 432, a first affixing protrusion 433, and an auxiliary pressing projection 434. The first positioning seat 430 is fixed on the fixing mount 41, the first upright cylinder 431 is secured on the first positioning seat 430, and the first vertical moving block 432 is driven by the first upright cylinder 431 to vertically move on the first positioning seat 430. The first affixing protrusion 433 is disposed on and moves vertically with the first vertical moving block 432 and has three screw orifices 435 formed adjacent to a lower side thereof. A width of the auxiliary pressing projection 434 is less than the first affixing protrusion 433, and the auxiliary pressing projection 434 has a cutout 436 arranged on a top end thereof to retain with the first affixing protrusion 433 and has a through hole 437 defined on a front surface thereof to insert a coupling bolt 438, such that the coupling bolt 438 is alternatively locked with one of the three screw orifices 435 so that one end surface of the auxiliary pressing projection 434 extends toward and flushes with the first movable fixing block 422.

The outer clamp device 50 includes a moving pedestal 51, a second horizontal clamping module 52, and a second upper clamping module 53. The moving pedestal 51 is disposed on the fixing mount 41 and has a bottom end slidably connecting with the two parallel sliding rails 31 of the support holder 30. The moving pedestal 51 has an external clamp arm 510 extending outwardly from one side thereof to hold the respective one of the plural workpieces A2 and has a second clamp block 511 mounted on the external clamp arm 510, a chip scraping sheet 512 fixed on a bottom end thereof and scrapping the iron chips into the two chip outlets 32, when the moving pedestal 51 moves toward the fixing mount 41. The second horizontal clamping module 52 has an outward telescopic cylinder 520, a second slide block 521 driven by the outward telescopic cylinder 520 to horizontally move on the moving pedestal 51, a second movable fixing block 522 secured on the second slide block 521, such that the outward telescopic cylinder 520 drives the second movable fixing block 522 to move horizontally to clamp the respective one of the plural workpieces A2 relative to the second clamp block 511. The second upper clamping module 53 includes a second positioning seat 530 connected with the moving pedestal 51, a second upright cylinder 531 disposed on the second positioning seat 530, a second vertical moving block 532 driven by the second upright cylinder 531 to longitudinally move on the second positioning seat 530, and a second affixing protrusion 533 joined and moving with the second vertical moving block 532, such that the second upright cylinder 531 drives the second affixing protrusion 533 to longitudinally move to clamp the respective one of the plural workpieces A2 relative to the external clamp arm 510.

The driving device 60 includes a servo motor 61 and a drive column 62. The servo motor 61 is mounted in the fixing mount 41, and the drive column 62 is inserted into the moving pedestal 51 to be driven by the servo motor 61 to rotate, such that the moving pedestal 51 is driven by the servo motor 61 to move close to or away from the fixing mount 41.

Figure 4:
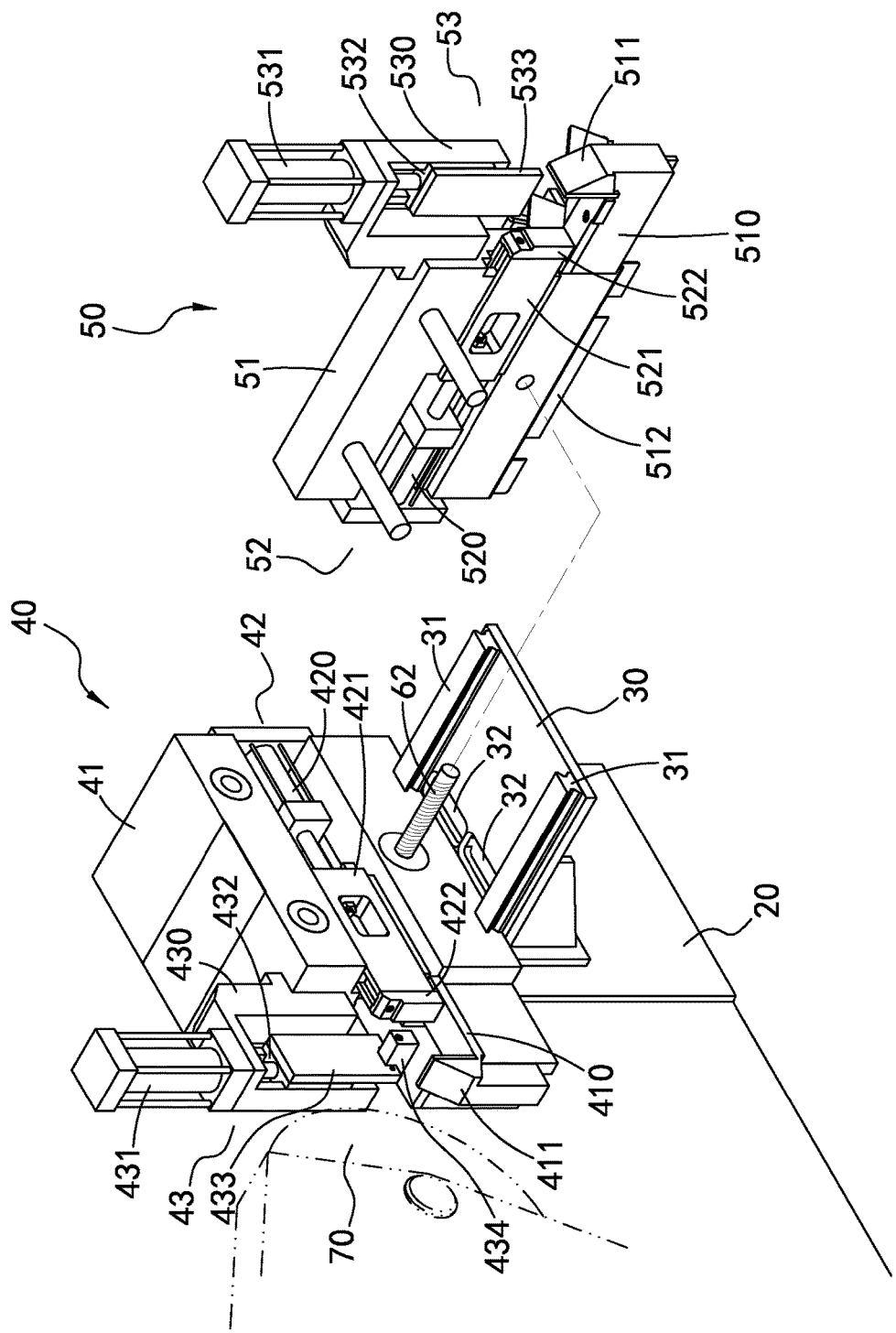
FIG. 4 is a perspective view showing the exploded components of a clamping mechanism for a circular saw machine according to a preferred embodiment of the present invention.
Figure 5:
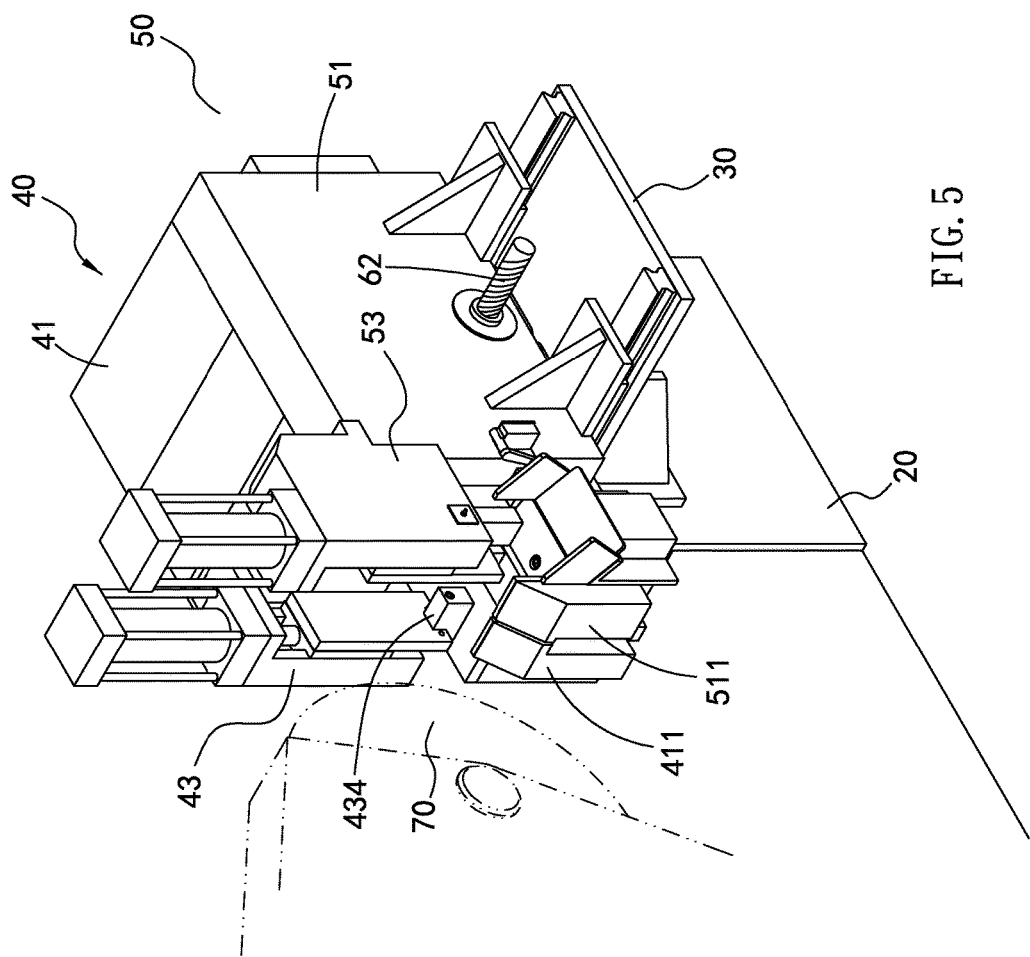
FIG. 5 is a perspective view showing the assembly of the clamping mechanism for the circular saw machine according to the preferred embodiment of the present invention.
Figure 6:
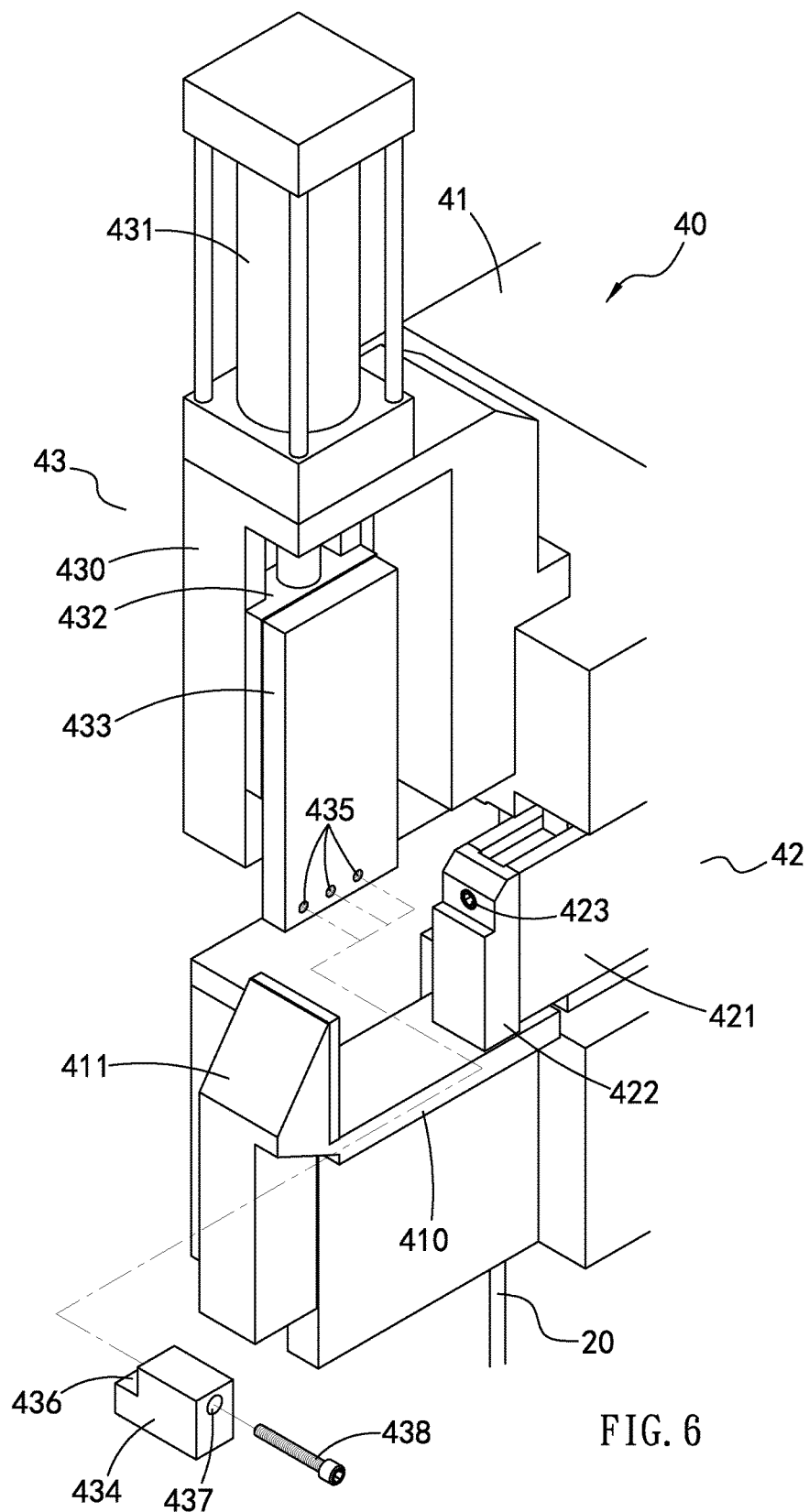
FIG. 6 is a perspective view showing the exploded components of an auxiliary pressing projection of the clamping mechanism for the circular saw machine according to the preferred embodiment of the present invention.
Figure 7:
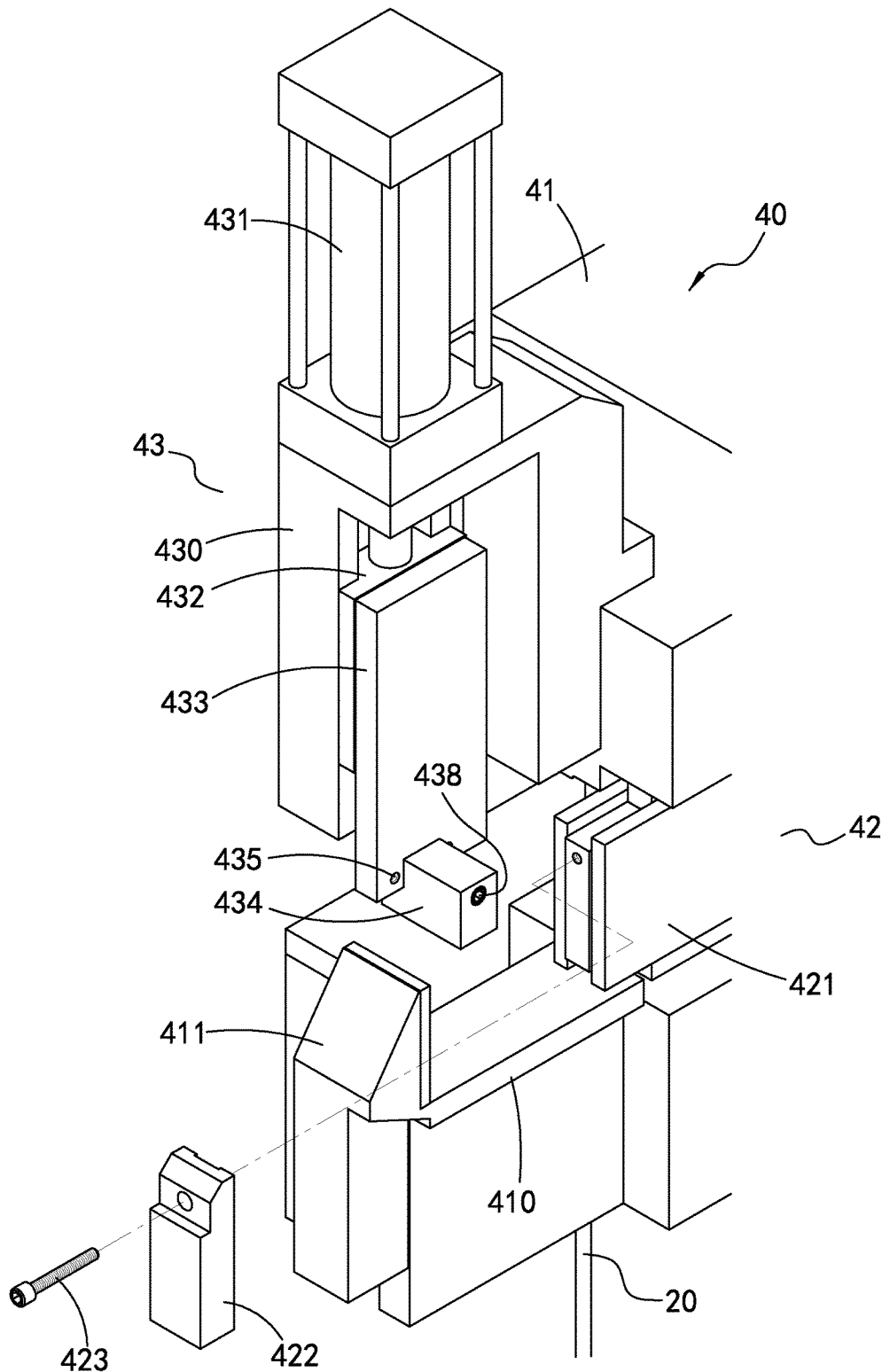
FIG. 7 is a perspective view showing the exploded components of a first movable fixing block of the clamping mechanism for the circular saw machine according to the preferred embodiment of the present invention.
Figure 8:
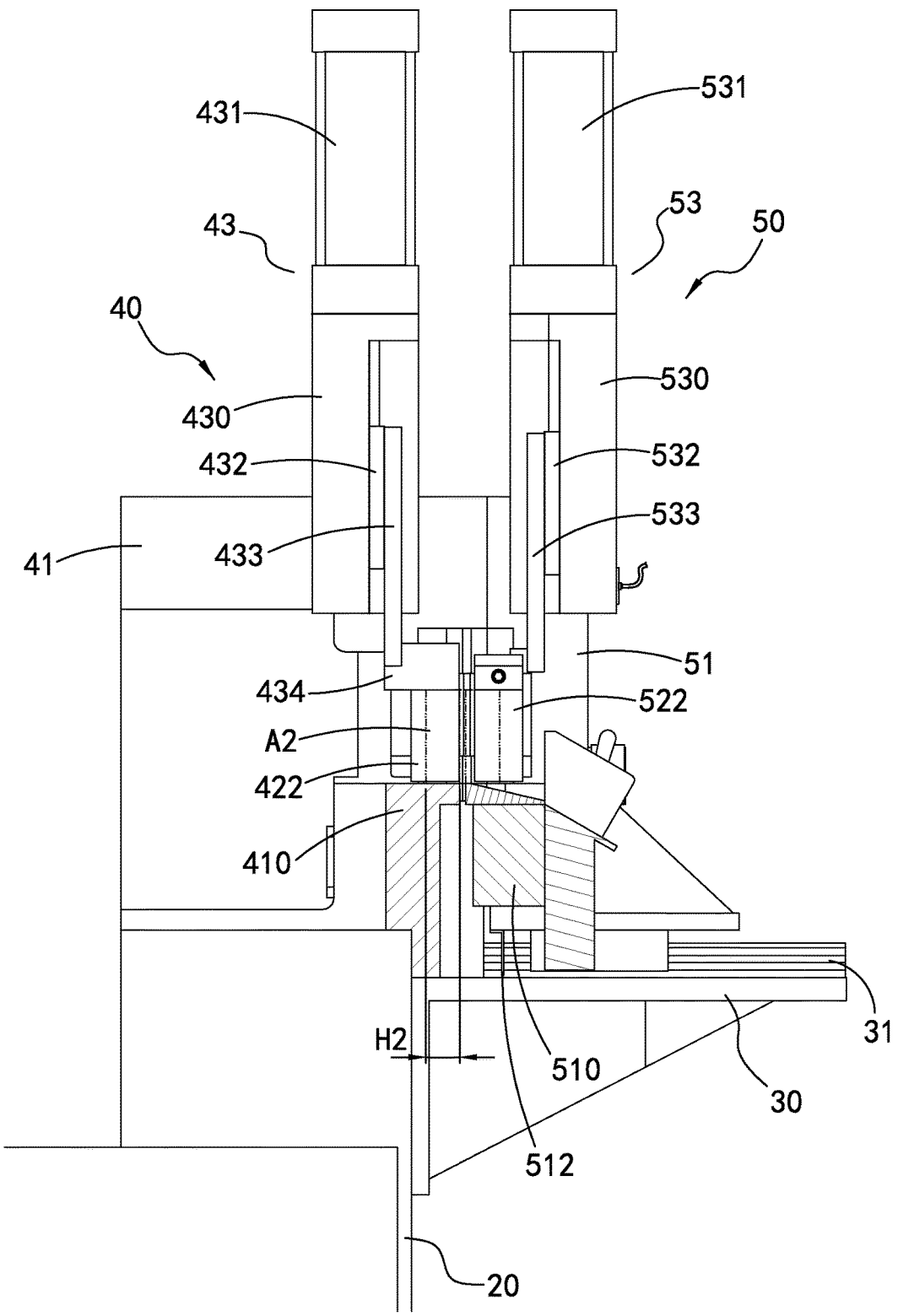
FIG. 8 is a cross sectional view showing the operation of the clamping mechanism for the circular saw machine according to the preferred embodiment of the present invention.

Referring to FIGS. 4 and 8, the clamping mechanism of the circular saw machine extends toward and flushes with the first movable fixing block 422 by using the auxiliary pressing projection 434, the width of the auxiliary pressing projection 434 is less than the first affixing protrusion 433 so that the auxiliary pressing projection 434 clamps the respective one of the plural workpieces A2 close to a sawing position and is not interfered with the first movable fixing block 422. Thereby, the auxiliary pressing projection 434 presses the respective one of the plural workpieces A2 and the outer clamp device 50 clamps the respective one of the plural workpieces A2 outwardly so that the respective one of the plural workpieces A2 is sawed by the sawing disc 70 precisely and securely, thus reducing a sawing length H2 of a tail end of the respective one of the plural workpieces A2 to save working cost.

Figure 9:
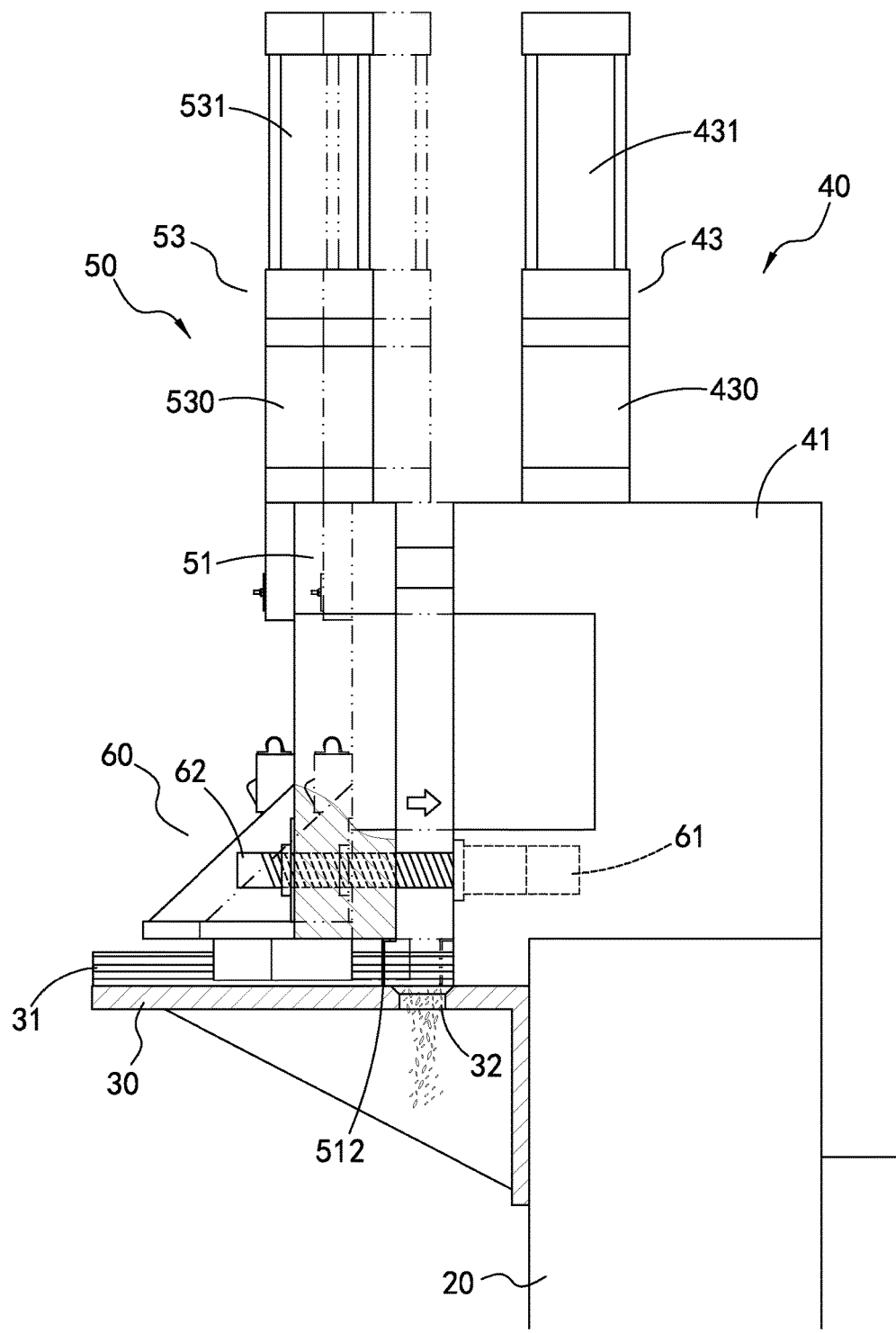
FIG. 9 is a cross sectional view showing the operation of a support holder of the clamping mechanism for the circular saw machine according to the preferred embodiment of the present invention.

As illustrated in FIG. 9, when the moving pedestal 51 moves toward the fixing mount 41, chip scraping sheet 512 scraps the iron chips on the support holder 30 into the two chip outlets 32, when the moving pedestal 51 moves toward the fixing mount 41, thereby removing the iron chips automatically.

Figure 11:
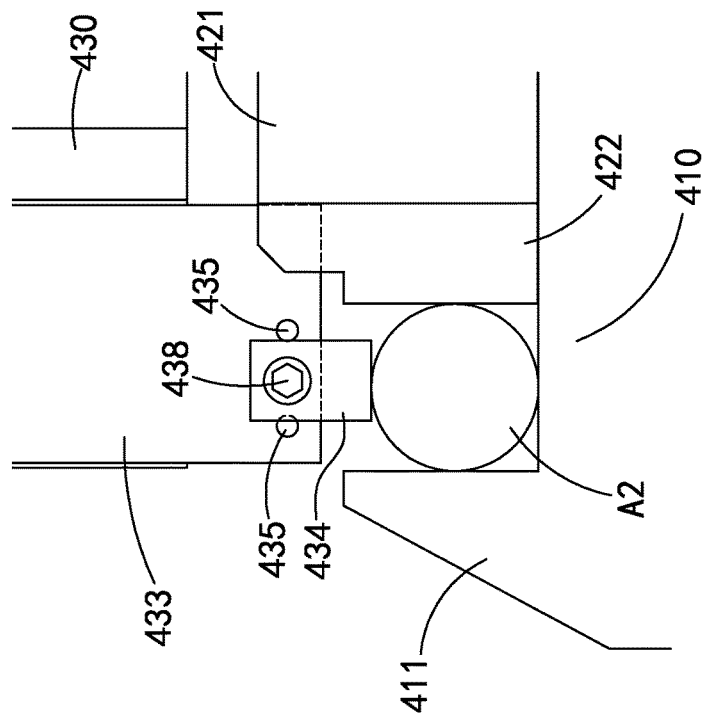
FIG. 11 is another plan view showing the operation of the auxiliary pressing projection of the clamping mechanism for the circular saw machine according to the preferred embodiment of the present invention.
Figure 10:
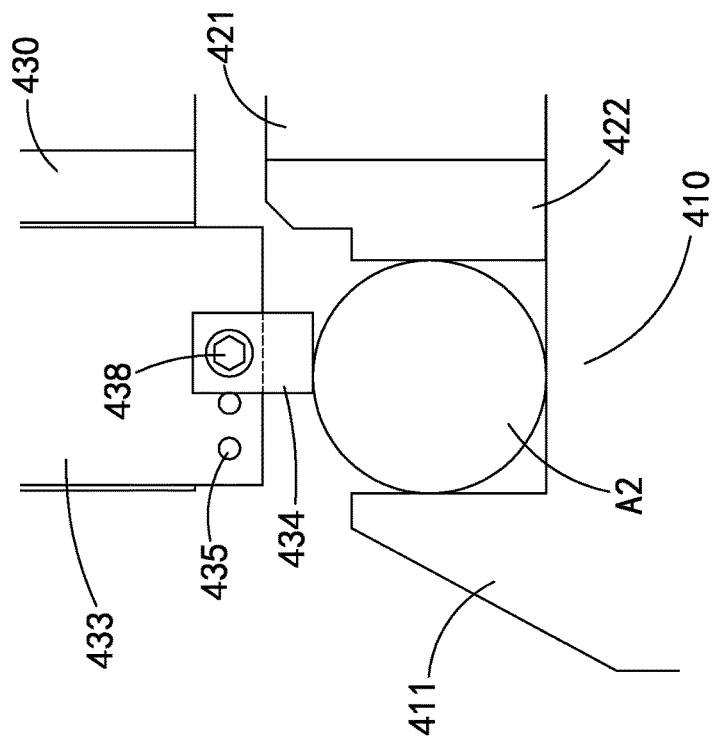
FIG. 10 is a plan view showing the operation of the auxiliary pressing projection of the clamping mechanism for the circular saw machine according to the preferred embodiment of the present invention.
Figure 12:
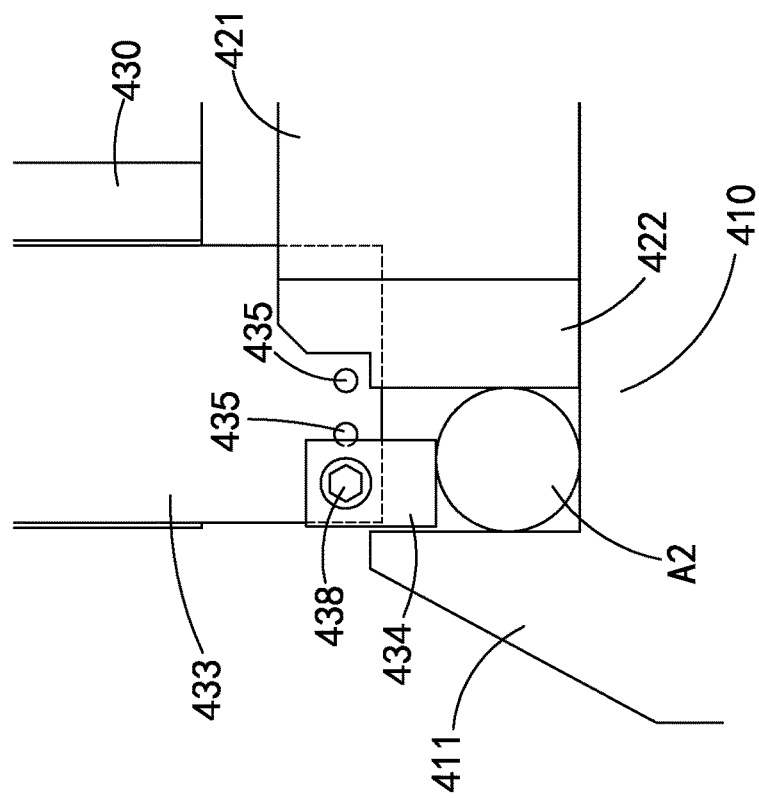
FIG. 12 is also another plan view showing the operation of the auxiliary pressing projection of the clamping mechanism for the circular saw machine according to the preferred embodiment of the present invention.

Referring further to FIGS. 10-12, the coupling bolt 438 is alternatively locked with one of the three screw orifices 435 by ways of the coupling bolt 438 to comply with the plural workpieces of various outer diameters.

Figure 13:
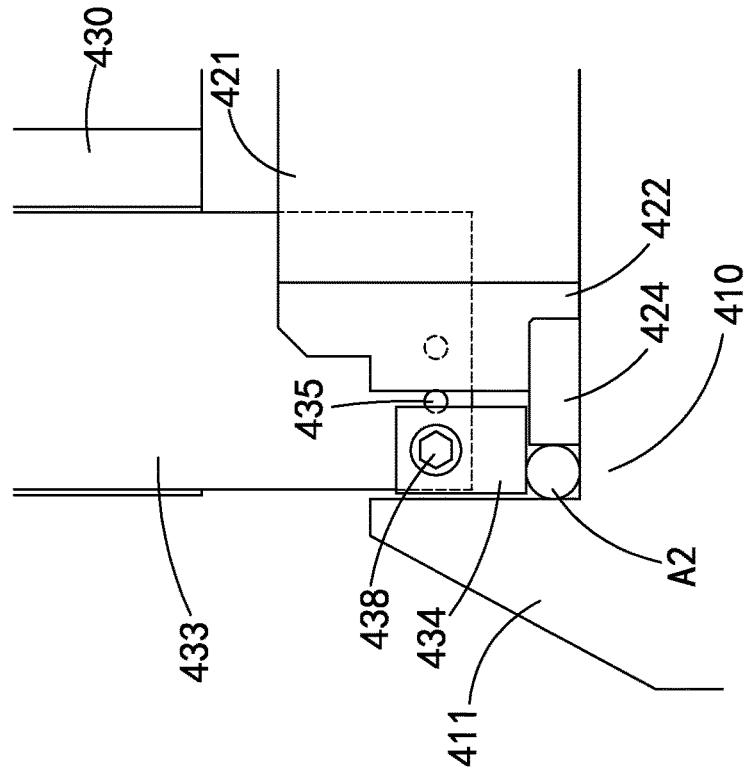
FIG. 13 is a plan view showing the operation of the clamping mechanism for the circular saw machine according to the preferred embodiment of the present invention.

With reference to FIG. 13, when a diameter of the respective one of the plural workpieces A2 is less that the width of the auxiliary pressing projection 434, the first slide block 421 is replaced by the first movable fixing block 422 with a raised block 424. The raised block 424 is fixed on a lower end of the movable fixing block 422 and extends toward the first clamp block 411, and a top surface of the movable fixing block 422 is lower than that of the respective one of the plural workpieces A2 so as to clamp the respective one of the plural workpieces A2 with a small outer diameter by matching with the auxiliary pressing projection 434.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A clamping mechanism for a circular saw machine comprising:
   a base;
   a support holder disposed on one side surface of the base and including two parallel sliding rails arranged on a top end thereof;
   an inner clamp device including a fixing mount, a first horizontal clamping module, and a first upper clamping module, the fixing mount being fixed on the base and having an internal clamp arm for clamping a respective one of plural workpieces of various outer diameters thereon and having a first clamp block secured on an end portion thereof; the first horizontal clamping module being disposed on the fixing mount and having a first movable fixing block moving laterally so that the first clamp block clamps the respective one of the plural workpieces; the first upper clamping module including a first positioning seat, a first affixing protrusion, and an auxiliary pressing projection, the first positioning seat being fixed on the fixing mount, the first affixing protrusion being disposed on and moving vertically on the first positioning seat, an end surface of the auxiliary pressing projection extending toward and flushing with the first movable fixing block, and a width of the auxiliary pressing projection being less than the first affixing protrusion so that the auxiliary pressing projection clamps the respective one of the plural workpieces;
   an outer clamp device including a moving pedestal, a second horizontal clamping module, and a second upper clamping module, the moving pedestal being disposed on the fixing mount and having a bottom end slidably connecting with the two parallel sliding rails of the support holder, the moving pedestal having an external clamp arm extending outwardly from one side thereof to hold the respective one of the plural workpieces and having a second clamp block mounted on the external clamp arm, the second upper clamping module having a second movable fixing block moving horizontally to clamp the respective one of the plural workpieces relative to the second clamp block; the second upper clamping module including a second positioning seat connected with the moving pedestal and a second affixing protrusion longitudinally moving to clamp the respective one of the plural workpieces relative to the external clamp arm;
   a driving device including a servo motor and a drive column, the servo motor being mounted in the fixing mount, and the drive column being inserted into the moving pedestal to be driven by the servo motor to rotate, such that the moving pedestal is driven by the servo motor to move close to or away from the fixing mount;
   wherein an end surface of the auxiliary pressing projection extends toward and flushes with the first movable fixing block;
   wherein the support holder includes at least one chip outlet defined between the parallel two sliding rails, the moving pedestal includes a chip scraping sheet fixed on a bottom end for scrapping iron chips into the at least one chip outlet, when the moving pedestal moves toward the fixing mount, and the at least one chip outlet has a tilted wall so as to guide the iron chips to fall therein along the tilted wall of the at least one chip outlet.

2. The clamping mechanism for the circular saw machine as claimed in claim 1, wherein the first affixing protrusion has a plurality of screw orifices formed adjacent to a lower side thereof, the auxiliary pressing projection has a cutout arranged on a top end thereof to retain with the first affixing protrusion and has a through hole defined on a front surface thereof to insert a coupling bolt, such that the coupling bolt is alternatively locked with one of the plurality of screw orifices.

3. The clamping mechanism for the circular saw machine as claimed in claim 1, wherein the first horizontal clamping module has an inner telescopic cylinder disposed on the fixing mount and driving a first slide block to horizontally move on the inner clamp device.

4. The clamping mechanism for the circular saw machine as claimed in claim 3, wherein the second horizontal clamping module has an outward telescopic cylinder and a second slide block driven by the outward telescopic cylinder to horizontally move on the moving pedestal.

5. The clamping mechanism for the circular saw machine as claimed in claim 4, wherein the first upper clamping module includes a first upright cylinder secured on the first positioning seat and a first vertical moving block driven by the first upright cylinder to vertically move on the first positioning seat.

6. The clamping mechanism for the circular saw machine as claimed in claim 1, wherein the first movable fixing block has a block fixed on a lower end thereof and extending toward the first clamp block, and a top surface of the first movable fixing block is lower than that of the respective one of the plural workpieces so as to clamp a respective one of the plural workpieces with a small outer diameter by matching with the auxiliary pressing projection.

* * * * *